Figure 1:
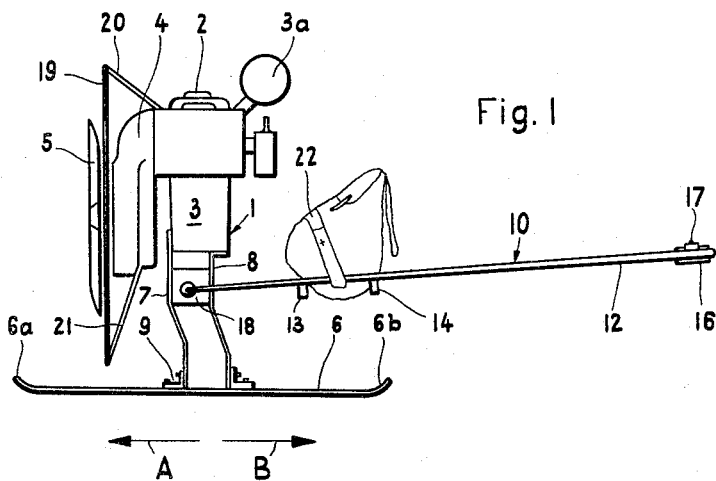

Sept. 5, 1961  J. NIKLAS  2,998,859
PROPELLER-DRIVEN SNOW VEHICLE
Filed Feb. 16, 1959  2 Sheets-Sheet 1

INVENTOR.
Josef Niklas
BY Michael S. Striker
Attorney

Sept. 5, 1961 J. NIKLAS 2,998,859
PROPELLER-DRIVEN SNOW VEHICLE
Filed Feb. 16, 1959 2 Sheets-Sheet 2
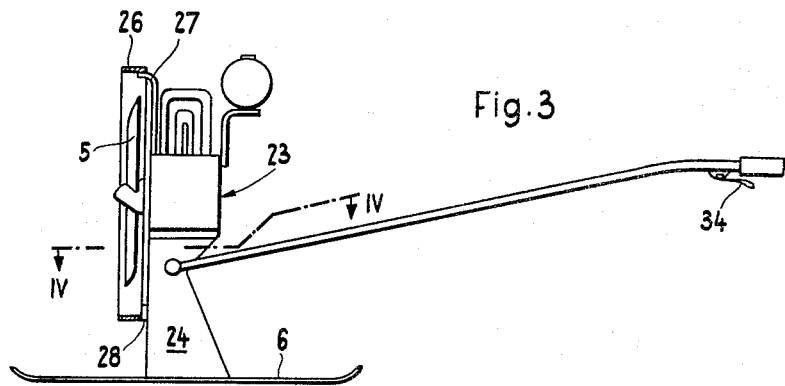
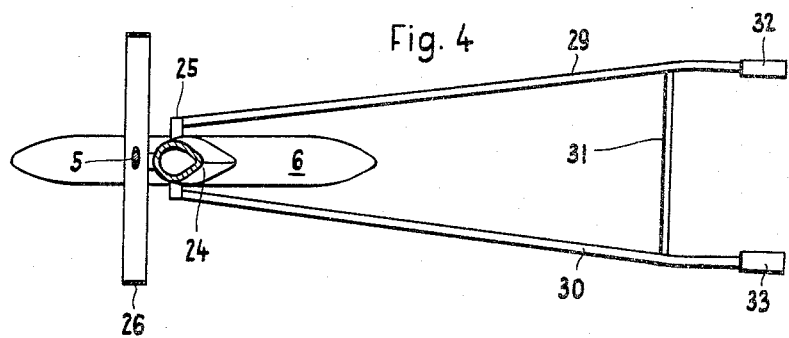
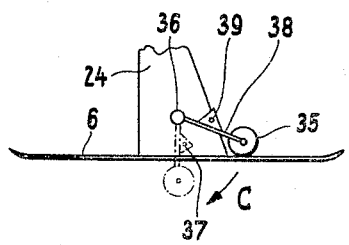
INVENTOR.
Josef Niklas
BY Michael S. Striker
Attorney United States Patent Office 2,998,859
Patented Sept. 5, 1961

2,998,859
PROPELLER-DRIVEN SNOW VEHICLE
Josef Niklas, Dorfstrasse 11, Oberammergau,
Bavaria, Germany
Filed Feb. 16, 1959, Ser. No. 793,350
Claims priority, application Germany Feb. 27, 1958
5 Claims. (Cl. 180—3)

The present invention relates to a motor-driven conveyance for traveling on snow to be used in sport or in business for pulling or pushing one or more persons or loads along snow-covered areas which may be either level or slightly sloping.

Motor-driven conveyances for traveling or transporting loads along snow-covered surfaces are known in the form of so-called motor sleds which mostly consist of a fully enclosed cabin which is mounted on at least two, but usually three skids and contains the engine for driving a pusher propeller. The known motor sleds of the open type, on the other hand, consist of a skeleton or box-shaped structure which supports a seat or stand for the operator. All of these known motor sleds have in common that the seat or stand for the operator is mounted on the sled itself, that the latter consists of at least two skids, and that the means for controlling the operation of the sled include a steering column which is rotatable about a vertical axis for steering the sled by turning one or more skids or the engine itself with the propeller thereon to change the direction of travel.

These prior motor sleds have the great disadvantage of being relatively heavy and clumsy and of a complicated construction, of being rather expensive, of requiring considerable space, and of being difficult to transport in the event that there is insufficient snow to slide on.

It is an object of the present invention to provide an apparatus which overcomes all of these disadvantages of previous motor sleds and forms an excellent conveyance for transporting persons and loads, and especially an individual person and smaller loads, over greater distances and at a considerable speed. Another object of the invention is to provide such a conveyance which is easily manipulated, has a low consumption of fuel, and may be easily transported on another conveyance, and which for all of these reasons is excellently adapted to be used in sports.

The new conveyance for traveling on snow which is driven by a motor-operated propeller forms a unit separate from the load to be transported and the operator steering the same and comprises a single skid which supports the chassis and the engine thereon which drives the propeller, and an extended rod-shaped steering arm which is pivotable on the chassis about a horizontal axis and made of such a length as to allow the operator to move independently of the apparatus.

The operator who is to be pulled or pushed by the apparatus may then stand on his own skis or sit on a separate sled. If any additional loads, for example, knapsacks or the like, are to be carried, they may be placed on the rod-shaped steering arm at a point near the center of gravity of the entire apparatus or they may be carried on a separate towed sled. The application of the new conveyance is extremely versatile and not restricted to any particular purpose. Thus, for example, it may be used for transporting sick or injured persons over large snow-covered areas which are devoid of cleared roads.

Further objects, features, and advantages of the present invention will become apparent from the following detailed description thereof, particularly when read with reference to the accompanying diagrammatical drawings, in which—

Figure 2:
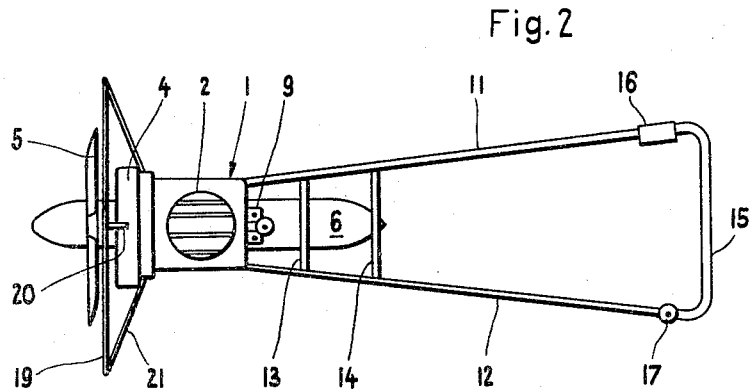

FIGURE 1 shows a side view of an apparatus according to the invention on a considerably reduced scale;

FIGURE 2 shows a plan view of the same apparatus;
FIGURE 3 shows a side view of a modification of the apparatus according to the invention;
FIGURE 4 shows a cross section taken along line IV—IV of FIGURE 3; while
FIGURE 5 shows a partial side view of a detail of the invention.

Referring to the drawings, and first particularly to FIGURES 1 and 2, numeral 1 generally indicates a conventional air-cooled engine which essentially consists of a cylinder 2, a crankcase 3, a cooling fan 4, and a fuel tank 3a. The engine 1 drives, preferably directly, a propeller 5 which produces a traction upon the entire apparatus in the direction indicated by the arrow A.

Engine 1 is mounted on a single skid 6 of a sufficient width which is bent upwardly at its front and rear ends 6a and 6b, respectively, so as to permit the operator to travel not only forwardly in the direction A, but also to use the apparatus on strongly inclined surfaces as a brake when traveling in the opposite direction B with the apparatus at the rear of the operator. The rotation of propeller 5 will then oppose the movement in the direction B, and the brake action thus produced may be varied by suitable adjustments of the engine operation.

Engine 1 is mounted on the single skid 6 in the most suitable position insofar as the center of gravity is concerned. Thus, for example, in the embodiment of the invention according to FIGURE 1, a pair of strong brackets 7 and 8 are mounted in a spaced relation to each other and are bolted at one end to crankcase 3 and at the other end to skid 6, for example, by angle irons 9.

For operating the engine, that is, for adjusting its speed and possibly also for stopping it, as well as for steering the apparatus and for holding on to it, the same is provided with a yoke-shaped steering arm 10. As illustrated more clearly in FIGURE 2, in which the fuel tank 3a has been omitted for the sake of clarity, steering arm 10 is made of a rod-shaped structure and consists of two side arms 11 and 12, two reinforcing crossrods 13 and 14, and a crossrod 15 at the outer end serving as a handle portion. One of the side arms 11 preferably carries a rotary handle 16 for controlling the speed of the engine, while the other side arm 12 carries an ignition switch 17 which may be, for example, in the form of a pushbutton for quickly stopping the engine in the event of danger.

The entire steering arm 10 is mounted at the most suitable point of the motor so as to be pivotable about a horizontal axis to render the steering operation as easy as possible and to permit any person regardless of his size to operate the apparatus. For this purpose, a pair of crossbars 18 connect the brackets 7 and 8 with each other and together serve as a bearing for a horizontal shaft on which the side arms 11 and 12 are mounted or as a bearing for directly supporting the inwardly bent ends of side arms 11 and 12.

In order to prevent an accidental access to the rotating propeller and also to protect the latter from being damaged, for example, if the apparatus should tilt over sideways, the propeller is surrounded by a ring 19 which may be secured in any suitable manner on the motor, for example, by stays 20 and 21.

FIGURE 1 also illustrates that the steering arm 10 may be utilized for carrying smaller additional loads, for example, a knapsack. The crossbars 13 and 14 are then preferably made of an angular shape so that their central parts extend below the level of the side arms 11 and 12 to form a basketlike support on which the load to be carried may be placed and secured by straps 22 or the like.

FIGURES 3 and 4 illustrate a slightly modified design of the apparatus according to the invention. The engine 23 of this embodiment does not have a cooling fan inasmuch as the air current produced by the propeller 5 will usually be sufficient to cool the engine, especially in view of the fact that the apparatus is only intended to be operated when the outside temperature is rather low.

The embodiment according to FIGURES 3 and 4 differs from that according to FIGURES 1 and 2 primarily by the fact that the connection between engine 23 and skid 6 is formed by a one-piece supporting bracket 24 which may be made, for example, of a casting of light metal and may have at its lower end an inwardly extending flange for securing it to skid 6. Such a supporting bracket may also be made of a streamlined shape, as indicated in FIGURE 4. This will not only increase the efficiency of the apparatus but also produce a compartment in which certain parts of the apparatus, for example, the air filter for the engine may be mounted. This compartment may also be provided with a suitable door, not shown, so as to permit an easy access thereto and also to permit loose parts, for example, tools, to be stored therein. The supporting bracket 24 also forms a bearing for rotatably mounting the shaft 25 therein on which the side arms 29 and 30 of the steering handle are mounted.

In order to increase the safety of the apparatus and to protect the propeller from being damaged, the latter is surrounded by a cylindrical member 26 of a sufficient width which may be secured in any suitable manner, for example, to motor 23 and bracket 24, by connecting members 27 and 28, respectively.

Instead of having a transverse handle bar at its rear end as in the embodiment according to FIGURES 1 and 2, the steering member according to FIGURES 3 and 4 has a crossbar 31 connecting the side arms 29 and 30, and these side arms are extended toward the rear and their free ends are provided with handles 32 and 33, one of which may be rotary to serve as a control handle for adjusting the speed of the engine. One of the free ends of side arms 29 and 30 may also be provided with a control lever 34 serving as an ignition switch, especially for stopping the engine immediately in the event of danger.

The Bowden wires, cable, or the like which are to be connected to the rotary handle 16 or 32 and the switch member 17 or 34 for operating the engine may either extend along the outside of the side arms 11 and 12 or 29 and 30, respectively, or along the inside thereof.

In order to permit the apparatus according to the invention also to be moved along areas which are not covered with snow, either by pushing or pulling it manually or by utilizing the driving power of its engine, the brackets 7 and 8 according to FIGURES 1 and 2 or the single bracket 24 according to FIGURES 3 and 4 may also support a pair of rollers 35, as shown in FIGURE 5, which are rotatably mounted at both sides of skid 6 on arms 38 which, in turn, are pivotably mounted at 36. If the skid 6 with the entire apparatus thereon is to be elevated from the ground and its conveying function be replaced by that of rollers 35, the latter are pivoted downwardly in the direction shown by the arrow C and to the position indicated in dotted lines, in which they may be secured, for example, by inserting a bolt or rod 37 into a pair of fishplates or the like 39 on arms 38 and into bracket 24. If the apparatus is to be used normally for traveling on snow, rollers 35 may be pivoted upwardly so as to be above the level of skid 6, and be secured in such a position by the same bolt or rod 37.

Although in the above description it has been assumed that the apparatus according to the invention will be provided with a tractor propeller, it is also possible to provide it instead with a pusher propeller.

For operating the apparatus, the engine is started in the conventional manner, whereupon its speed is adjusted and controlled by means of the rotary handle 16 or 32, respectively. If a slight pressure is exerted upon one or the other side arm 11, 12 or 29, 30, skid 6 will be slightly tilted about its longitudinal axis so as to travel along a curve of a radius in accordance with the degree of such pressure.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A pulling arrangement, comprising, in combination, a single substantially ski-shaped runner means having a substantially smooth bottom face and free of means adapted to drivingly engage a surface on which said ski-shaped runner means is placed; solely air-engaging driving means rotatable about a given axis of rotation and mounted on said ski-shaped runner means for moving the same forward in the longitudinal direction of said ski-shaped runner means; and an elongated rigid gripping member connected at one end to one of said means and turnable about an axis located at a level below the axis of rotation of said driving means and substantially transverse to the longitudinal direction of said runner means, said gripping member extending in a direction rearwardly from said runner means so as to be adapted to be gripped at the other end by the user of said pulling arrangement, the connection between said one end of the gripping member and said one means being such that said gripping member is held against lateral movement with respect to said runner means, whereby during operation of said driving means a user gripping the rear end of said elongated gripping member will be pulled in longitudinal direction of said ski-shaped runner means while simultaneously being in a position to vary the direction of pulling by moving the rear end of said gripping means in lateral direction thus adjusting the direction of said ski-shaped runner means and simultaneously also adjusting the direction of pull exerted by said air-engaging driving means so as to coincide with the longitudinal direction of said ski-shaped runner means.

2. A pulling arrangement, comprising, in combination, a single substantially ski-shaped runner means having a substantially smooth bottom face and free of means adapted to drivingly engage a surface on which said ski-shaped runner means is placed; solely air-engaging driving means rotatable about a given axis of rotation and fixedly mounted on said ski-shaped runner means for moving the same forward in the axial direction of said ski-shaped runner means; and an elongated rigid gripping member connected at one end to one of said means and turnable about an axis located at a level below the axis of rotation of said driving means and substantially transverse to the axial direction of said runner means, said gripping member extending in a direction rearwardly from said runner means so as to be adapted to be gripped at the other end by the user of said pulling arrangement, the connection between said one end of the gripping member and said one means being such that said gripping member is held against lateral movement with respect to said runner means, whereby during operation of said driving means a user gripping the rear end of said elongated gripping member will be pulled in axial direction of said ski-shaped runner means while simultaneously being in a position to vary the direction of pulling by moving the rear end of said gripping means in lateral direction thus adjusting the direction of said ski-shaped runner means and simultaneously also adjusting the direction of pull exerted by said air-engaging driving means so as to coincide with the axial direction of said ski-shaped runner means.

3. A pulling arrangement, comprising, in combination, a single substantially ski-shaped runner means having a substantially smooth bottom face and free of means adapted to drivingly engage a surface on which said ski-shaped runner means is placed; solely air-engaging driving means rotatable about a given axis of rotation and fixedly mounted on said ski-shaped runner means for moving the same forward in axial direction of said ski-shaped runner means; and an elongated rigid gripping member connected at one end to one of said means for pivotal movement about a horizontal axis located at a level below the axis of rotation of said driving means and substantially transverse to the axial direction of said runner means, said gripping member extending in a direction rearwardly from said runner means so as to be adapted to be gripped at the other end by the user of said pulling arrangement, the pivotal connection between said gripping member and said one means being such that the gripping member is held against lateral movement with respect to said runner means, whereby during operation of said driving means a user gripping the rear end of said elongated gripping member will be pulled in axial direction of said ski-shaped runner means while simultaneously being in a position to vary the direction of pulling by moving the rear end of said gripping means in lateral direction thus adjusting the direction of said ski-shaped runner means and simultaneously also adjusting the direction of pull exerted by said air-engaging driving means so as to coincide with the axial direction of said ski-shaped runner means.

4. A pulling arrangement, comprising, in combination, a single substantially ski-shaped runner means having a substantially smooth bottom face and free of means adapted to drivingly engage a surface on which said ski-shaped runner means is placed, said ski-shaped runner means having upturned ends to facilitate motion in either axial direction; solely air-engaging driving means adapted to move said ski-shaped runner means forward in axial direction of said ski-shaped runner means, said air-engaging driving means comprising an engine, means fixedly mounting said engine on said ski-shaped runner means at an area in substantial proximity to the center thereof and a propeller driven by said engine, said propeller being mounted to rotate about an axis in the axial direction of said ski-shaped runner means; and an elongated rigid gripping member connected at one end to said engine mounting means for pivotal movement about a horizontal axis located at a level below the axis of said propeller and substantially transverse to the axial direction of said runner means, said gripping member extending in a direction rearwardly from said runner so as to be adapted to be gripped at the other end by the user of said pulling arrangement, the connection between said gripping member and said engine mounting means being such that said gripping member is held against lateral movement with respect to said runner means, whereby during operation of said driving means a user gripping the rear end of said elongated gripping member will be pulled in axial direction of said ski-shaped runner means while simultaneously being in a position to vary the direction of pulling by moving the rear end of said gripping member in lateral direction thus adjusting the direction of said ski-shaped runner means and simultaneously also adjusting the direction of pull exerted by said air-engaging driving means so as to coincide with the axial direction of said ski-shaped runner means, said elongated gripping member comprising at least a pair of rod-like members connected to each other to form a yoke pivotally secured about a horizontal axis at one end to said engine mounting means and extending away from said engine in substantially the axial direction of said ski-shaped runner means to a point beyond the said runner means and a transverse handle member joining said rod-like members at said point beyond said runner means, said handle member being adapted to be gripped by the user.

5. A pulling arrangement, comprising, in combination, a single substantially ski-shaped runner means having a substantially smooth bottom face and free of means adapted to drivingly engage a surface on which said ski-shaped runner means is placed; solely air-engaging driving means rotatable about a given axis of rotation and mounted on said ski-shaped runner means for moving the same forward in longitudinal direction of said ski-shaped runner means; an elongated rigid gripping member connected at one end to one of said means turnable about an axis located at a level below the axis of rotation of said driving means and substantially transverse to the longitudinal direction of said runner means, said gripping member extending in a direction rearwardly from said runner means so as to be adapted to be gripped at the other end by the user of said pulling arrangement, the connection between said gripping member and said one means being such that said gripping member is held against lateral movement with respect to said runner means, whereby during operation of said driving means a user gripping the rear end of said elongated gripping member will be pulled in longitudinal direction of said ski-shaped runner means while simultaneously being in a position to vary the direction of pulling by moving the rear end of said gripping member in lateral direction thus adjusting the direction of said ski-shaped runner means and simultaneously also adjusting the direction of pull exerted by said air-engaging driving means so as to coincide with the longitudinal direction of said ski-shaped runner means; roller means; and means mounting said roller means on said ski-shaped runner means in a selected one of a first position wherein said roller means is maintained out of engagement with said surface while said ski-shaped runner means is simultaneously maintained in engagement with said surface and a second position wherein said roller means is maintained in engagement with said surface while said ski-shaped runner means is simultaneously maintained out of engagement with said surface.

References Cited in the file of this patent

UNITED STATES PATENTS

| | | |
|---|---|---|
| 1,007,497 | Simon | Oct. 31, 1911 |
| 1,473,281 | Colburn | Nov. 6, 1923 |
| 2,289,768 | Fehrenbacher | July 14, 1942 |
| 2,345,496 | Opheim | Mar. 28, 1944 |
| 2,528,890 | Lawrence | Nov. 7, 1950 |
| 2,702,502 | Rogneby | Feb. 22, 1955 |
| 2,738,845 | Bizjak | Mar. 20, 1956 |
| 2,914,018 | Schachner et al. | Nov. 24, 1959 |

FOREIGN PATENTS

| | | |
|---|---|---|
| 810,816 | France | Jan. 6, 1937 |
| 831,259 | Germany | Feb. 11, 1952 |

OTHER REFERENCES

Publication: "Popular Mechanics," vol. 110; issue No. 5; page 136; dated Nov. 5, 1958.